United States Patent [19]

Fisher

[11] 4,260,635
[45] Apr. 7, 1981

[54] UNITIZED ANIMAL FOOD SYSTEM PRODUCT

[76] Inventor: Stanton E. Fisher, 16 W. Brentmoor Park, St. Louis, Mo. 63105

[21] Appl. No.: 534,064

[22] Filed: Dec. 18, 1974

Related U.S. Application Data

[63] Continuation-in-part of Ser. No. 117,081, Feb. 19, 1971, abandoned, Ser. No. 221,035, Jan. 26, 1972, abandoned, and Ser. No. 242,428, Apr. 10, 1972, abandoned.

[51] Int. Cl.³ .............................................. A23K 1/00
[52] U.S. Cl. ........................................ 426/3; 426/90; 426/72; 426/74; 426/635; 426/805
[58] Field of Search ................ 426/3, 5, 89, 90, 92, 426/104, 132, 615, 623, 624, 627, 635, 630, 636, 641, 646, 656, 513, 518, 805, 72, 74

[56] References Cited

U.S. PATENT DOCUMENTS

| | | | |
|---|---|---|---|
| 2,879,163 | 3/1959 | Anson | 99/14 |
| 3,115,409 | 12/1963 | Hallinan | 99/7 |
| 3,202,514 | 8/1965 | Burgess | 426/805 |
| 3,574,633 | 4/1971 | Flier | 99/2 R |
| 3,694,234 | 9/1972 | Jones | 99/166 |
| 3,882,257 | 5/1975 | Cagle | 426/805 |
| 3,899,607 | 8/1975 | Miller et al. | 426/285 |
| 4,032,665 | 6/1977 | Miller et al. | 426/104 |

OTHER PUBLICATIONS

Kirk–Othmer, Encyclopedia of Chemical Technology, vol. 8, p. 858, (John Wiley & Sons, Inc., 1965).
West & Todd, Textbooks of Biochemistry, p. 1326, 1967, McMillan, N.Y.

Primary Examiner—Hiram Bernstein
Attorney, Agent, or Firm—Sidney B. Ring; Hyman F. Glass

[57] ABSTRACT

A simultaneously compacted, shaped, molded and unitized, self-contained, unit-integral, chew-resistant animal food system product containing animal food and structure-supporting fibers, preferably in a fibrous form, in an amount sufficient to make said product chew-resistant, self-contained and unit-integral and to enable it to be and remain in its compacted, shaped and molded form. The product contains sufficient structure-supporting fibers to yield a chew-resistant product. The structure-supporting fibers are animal safely digestible structure-supporting fibers, such as collagen, animal safely indigestible structure-supporting fibers, such as cellulosic materials, or a mixture of animal safely digestible structure-supporting fibers and animal safely indigestible structure-supporting fibers, such as a mixture of collagen and cellulosic materials. Illustrative food components are those animal foods currently used and known and are preferably in a dry, shelf-stable form such as dried meats, dried fish, fish meal, fish flour, cereals, fruits, etc., with or without food additives or supplements such as vitamins, minerals, medicinals, etc., for example chemicals, enzymes, etc., capable of removing plaque or tartar from the animal's teeth, etc. Sufficient structure-supporting fibers are mixed with the basic food components, the collagen thereof being preferably derived from animal skins or hides preferably in a fibrous form, and the structure-supporting fibers are capable of binding the food into the unitized chew-resistant product. Collagen, preferably derived from animal skins, is the preferred fiber. Also within the scope of this invention is a simultaneously compacted, shaped, molded and unitized, self-contained, unit-integral, chew-resistant multilayer animal food system product containing at least one chew-resistant layer and at least one lesser or non-chew-resistant layer, wherein the chew-resistance of said layers is primarily controlled or varied by the relative presence or absence of structure-supporting fibers incorporated into the particular layer of food components, as aforesaid, prior to contacting, said structure-supporting fibers being as aforesaid.

9 Claims, 3 Drawing Figures

U.S. Patent             Apr. 7. 1981             4,260,635

UNITIZED ANIMAL FOOD SYSTEM PRODUCT

This Application is a continuation-in-part Application of my Applications, Ser. Nos. 117,081, filed on Feb. 19, 1971, now abandoned 221,035, filed on Jan. 26, 1972 now abandoned and 242,428, filed on Apr. 10, 1972 now abandoned.

This Application is also copending with Application Ser. No. 343,835, filed on Mar. 25, 1973, now U.S. Pat. No. 4,145,447 entitled "Highly Compacted Animal Food System," Bernard W. Weinrich and I being and set forth as the joint inventors thereof and joint Applicants therefor.

My invention relates to my pet feeding unitized animal food system products.

My pet feeding unitized animal food system products are simultaneously compacted, shaped, molded, and unitized, self-contained, unit-integral, chew-resistant animal food system product and contain animal food and structure-supporting fibers. Said structure-supporting fibers are animal safely digestible structure-supporting fibers or animal safely indigestible structure-supporting fibers or a mixture of animal safely digestible structure-supporting fibers and animal safely indigestible structure supporting fibers. Said structure-supporting fibers are present in my animal food system products of my invention in an amount sufficient to make each of my products chew-resistant, self-contained and unit-integral and to enable each of them to be and remain in its compacted, shaped and molded form. Also within the scope of this invention is included my simultaneously compacted, shaped, molded and unitized, self-contained, unit-integral, chew resistant multilayer animal food system product with at least one chew-resistant layer with animal food as a part thereof at least one lesser chew-resistant layer likewise with animal food being at least a part thereof, the latter layer being less chew-resistant than said former layer, with the chew-resistance of each of said layers being primarily controlled by the relative presence or absence of structure-supporting fibers, as aforesaid, that is, animal safely digestible structure-supporting fibers or animal safely indigestible structure-supporting fibers or a mixture of animal safely digestible structure-supporting fibers and animal safely indigestible structure-suppporting fibers. Said structure-supporting fibers in my multilayer embodiment are present in said latter layer and in said former layer or in said latter layer or in said former layer in amounts or in an amount, as the case may be, sufficient to make said multilayer product chew-resistant, self-contained and unit-integral and to enable it to be and remain in its compacted, shaped and molded form.

The chew-resistance of each of my products, other than my multilayer products, as aforesaid, and as hereinafter described, is primarily controlled by the amount of structure-supporting fibers, as aforesaid, incorporated therein. With respect to my multilayer embodiments, the chew-resistance is, in addition, primarily controlled and/or varied by the amount or absence of structure-supporting fibers, as aforesaid, incorporated into the particular layer of food components prior to compacting.

As described in my copending Applications, Ser. Nos. 117,081 and 221,035, and as herein disclosed and claimed, my single layer pet feeding system products are self-contained units in various sizes and shapes and are in essence characterized by a compacted, self-contained unit which contains the pet's meal. In practice the food components, generally in dry or low moisture content, are mixed and the mixture molded into the desired size and shape. The size and shape will depend upon many factors, such as the size of the dog, the amount of food required for the feeding, etc. For example, the size could be that required for a single meal or increments thereof. The shape will depend upon the desired appearance, for example, the shape of a bone, a ball, a ring, an animal, a human, a stick, or any other imaginative, abstract, whimsical, amorphous or actual shape.

As described in my copending Application Ser. No. 242,428, which is a continuation-in-part of my said copending Applications, Ser. Nos. 117,081 and 221,035, my multilayer embodiment is such that there are employed at least one layer of a high chew-resistance and at least one layer of lesser or non-chew-resistance. The chew-resistance or hardness thereof can be controlled by a variety of techniques, for example, the amount and type of structure-supporting fibers, as aforesaid, the length, shape, width, etc., of the fibers, as aforesaid, the presence, absence or relative amount of the binder employed, the pressure employed in compacting the product, etc. For example, by incorporating structure-supporting fibers in the base layer of dry dog food and then preparing a second layer of dry dog food without structure-supporting fibers, as aforesaid, there will be obtained, when compacted, one of my multilayer products, with an inner hard and chew-resistant layer and an exterior layer relatively soft and crumbly as compared to said inner layer. Alternatively, by preparing an inner core without structure-supporting fibers, as aforesaid, and then superimposing a second layer with structure-supporting fibers, as aforesaid, thereon so as to yield a soft core layer and a hard exterior layer when compacted, the exterior layer will be hard and the inner, or interior, layer soft. By starting with a soft core layer and alternating the type of layers, I can compose different alternate layer ad iinfinitum, such as soft/hard/soft/hard/etc. Alternately by starting with a hard core and then superimposing a soft layer thereon, and alternating the other layers, I can obtain a product such as hard/soft/hard/soft/etc. In addition, the layers may have varying degrees of hardness. Thus, one layer may be hard, the second layer less hard, etc., or alternately soft, then hard, soft, hard, etc. In order to vary the chewing demand of the dog, the outer layer may be hard and the inner layer soft. By varying the thickness of each layer or number of alternate layers, a dog used to a soft diet could be gradually "weaned away" from such soft foods, which do not sufficiently exercise his teeth and jaws and remove plaque and tartar, to a chew-resistant product which is sufficiently hard to exercise his teeth and jaws and to remove plaque and tartar. Hard outer containers of chew-resistant pet food can be prepared and filled with softer pet food. The outer container can be in a wide variety of shapes, such as cones, cylinders, balls, squares, etc. In addition, by dipping a core repeatedly in rawhide or collagen fiber-containing pet food, chew-resistant layers or laminations of pet food can be built up to yield an extra hard chew-resistant product. Similarly, the hard and soft layer can be alternated or varied according to any desired pattern. Layers may be superimposed on one another so as to form a sandwich such as one that has an inner soft layer and exterior hard layers; or vice versa. Soft and hard sections can also be prepared with interlocking male and female indentions so that they can be joined together in the nature of jigsaw links into the desired configuration. By so joining, the desired shape in two or three dimensions can be created. Likewise, with respect to my multilayer embodiment, the shape will depend upon the desired appearance, for example, the shape of a bone, a ball, a ring, an animal, a human, a stick, or any other imaginative, abstract, whimsical, amorphous or actual shape.

Figure 1:
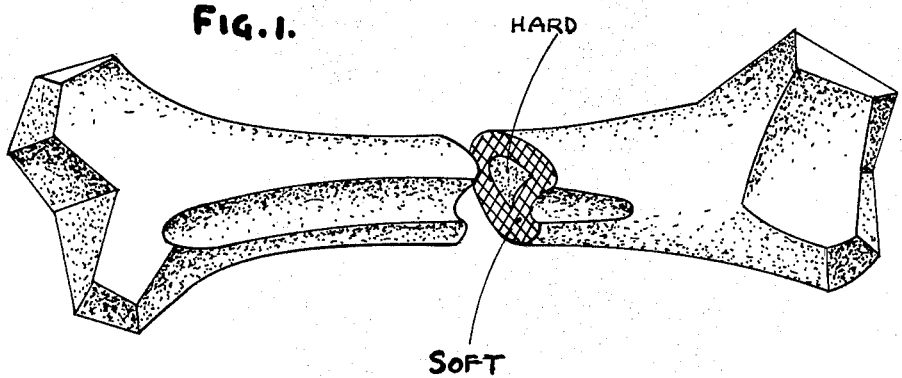
FIG. 1 illustrates one embodiment in the shape of a bone having a soft exterior layer and a hard core layer.

With respect to all embodiments, shapes are illustrated in the following U.S. Pat. Nos.: 3,104,648, Design Patents 202,330, 202,331, 202,332, 207,167, etc.

With respect to all embodiments of this invention, I have discovered by pet feeding system products hereof characterized by self-contained units in various sizes and shapes and further characterized by my compacted self-contained units, as aforesaid and also as hereinafter further described, which contains the pet's meal. In practice, the food components, generally in dry or low moisture content, are mixed with the structure-supporting fibers, as aforesaid and also as hereinafter further described, and the mixture molded into the desired size and shape. In all embodiments, the respective sizes and shapes will depend upon many factors, such as the size of the pet, the amount of food required for the feeding of the pet, etc. For example, the size could be that required for a single meal or increments thereof.

Many pet foods are available on the market, including canned foods, dehydrated foods, etc. However, the moisture content of these known foods is in the extreme ranges, i.e. the food is either very dry requiring the addition of water or has a high moisture content. Since said known types of such foods have little, if any, unit integrity, that is, they are not unit-integral, such known foods require containers and are not self-contained. My newly discovered unitized animal food system products on the other hand are both unit-integral and self-contained and do not require containers.

In addition, such known foods are so soft that the animal can "wolf" them down without much chewing, if any, so that the animal's jaws and teeth get little exercise. I have provided, for the first time, my unitized animal food system products which are chew-resistant and also unit-integral and also self-contained as well as compacted, shaped and molded. My products contain more than mere animal food; they contain, in addition to the animal food, structure-supporting fibers, as aforesaid and as further hereinafter described, present in amounts sufficient to make my products chew-resistant, self-contained (no packaging needed) and unit-integral and to enable them to be and remain in their compacted, shaped and molded forms. Each of my products is a single meal or a predetermined incremental portion of a single meal. All heretofore known and used animal foods have been such that the animal has been able to "wolf" them down without much chewing, if any, or that the animal has caused them to crumble easily without any chewing action of any consequence. In preparing the products of my invention herein, it is highly desirable that the molded units maintain their respective unit integrity so that the animal will be able to satisfactorily exercise its teeth, gums and jaws, and the molded units of my invention are such that they maintain their respective unit integrity so that the animal does exercise satisfactorily its teeth, gums and jaws. Where the heretofore known and used animal foods are compacted without structure-supporting fibers, as aforesaid and as further hereinafter described, those foods are crumbly, i.e. they disintegrate with little chewing action. My products of this invention, on the other hand, do have unit-integrity and do have product "chew-life".

With respect to the animal food components in my products, it is, in general, desirable that said food components have a satisfactory shelf-life so that preservation is no problem. Such food components include many of the foods currently available such as air dried, freeze-dried, irradiated, etc. foods, such as meat, fish, fish meal, cereals, vegetables, fruits, wheat germ, protein flour derived from fish, fish meal, etc. Many of these are currently available commercially under a wide variety of names. In addition to such known foods, any desired supplemental additives such as desired vitamins, food additives, medicines or other supplements, minerals, etc., can be added.

There have been cited various examples of heretofore known foods, including animal foods, by the Patent Office during the prosecution of my aforesaid Applications, and such were as follows: U.S. Pat. Nos. 3,115,409, 2,802,737, 2,879,163, 3,323,922, 3,574,633 and 3,694,434 together with a West and Todd publication on page 1326 of the Textbook of Biochemistry, published by MacMillan in 1967, relating only to "Fibers of Connective Tissue," said publication not mentioning food of any kind and type and degree. Those examples do not even suggest, let alone disclose, in any manner, shape or form, each taken alone or each in any combination desired, my products herein disclosed and also claimed.

I have also discovered that the unit-integrity or "chew life" of the products of this invention of mine is enhanced by the incorporation of structure-supporting fibers, as aforesaid, in the molded embodiments herein.

Any suitable structure-supporting fibers, as aforesaid and further hereinafter described, can be employed in this invention provided that they perform the function of binding the food into a unitized chew-resistant product and are not harmful to the pet. Such fibers include those which may or may not be digested by the animal, provided the pet's digestive system is capable of handling such fibers. For example, such fibers include animal safely digestible structure-supporting fibers, such as collagen, animal safely indigestible structure-supporting fibers, such as cellulosic fibers, or mixtures of such animal safely digestible structure-supporting fibers and such animal safely indigestible structure-supporting fibers, that is, mixtures of collagen and cellulosic fibers.

Now, a suitable source of animal safely digestible structure-supporting fibers include fibers derived from animal tissue—for example from the skin, muscles, intestines, etc. of animals, for example, from tendons, animal hides such as cowhide, rawhide, etc. One convenient method of preparing such animal safely digestible structure-supporting fibers is to cut, chip, grind, shred, shear, beat, etc., animal skins such as cowhide, rawhide, etc., or by combinations of these operations to yield collagen fibers which can be incorporated into the molded food to enhance its unit integrity. The amount of animal hides used as a source of collagen to be added to the molded product will depend upon many factors, such as for example, the type and amounts of fibers present in the hide, the type of subdivision of the hide, the type of food in the product, whether swollen or unswollen collagen or hide binders or gels are employed, etc. Collagen is a protein forming the chief constituent of connective tissue. In animal hide collagen constitutes the bulk of the fibrous protein, and for purposes of this invention is meant to include other fibrous protein such as elastin, reticulin, etc. Since hides contain collagenous fiber bundles, cutting, chopping, shredding, shearing, etc. divide these bundles into smaller sections. When work is performed on these cut segments, the smaller fibers are spread out over wider areas. Theoretically in the preparation of the product of this invention, the bundles of fibers are broken and then realigned so as to form fiber interlocks. To obtain maximum strength the cut fibers reinterlock in the final product so that a continuous fiber bond is formed to maintain the strength of the final product in the nature of a realigned fiber weave. In general, I place sufficient collagen fibers in the product to impart the desired properties in the final product. Thus, as is clearly apparent, a suitable source of animal safely digestible structure-supporting fibers include fibers derived from animal tissue—for example from the skin, muscles, intestines, etc., of animals, for example, from tendons, animal hides such as cowhide, rawhide, etc. Since collagen is a digestible protein, it not only maintains the unit integrity of the product but also enhances its food value. Thus, collagen is a protein supplement increasing the protein value of the food.

With respect to cellulosic materials, cellulosic fibers are a suitable source of animal safely indigestible structure-supporting fibers. For example, although cellulosic fibers are not digested by the pet, the pet's digestive system is capable of handling such fibers by passing them through its system substantially unchanged and unchanged. In fact, cellulosic fibers provide increased roughage and bulk to the food so as to assist the pet in the digestion of food.

Further, with respect to collagen fibers as examples of said safely digestible fibers, such include both collagen fibers which are obtained from hides as well as collagen fibers which are prepared by dissolving protein and then precipitating the protein from solution and aligning the molecules so as to obtain a fibrous material. Protein fibers are derived from soy protein, egg white, wheat gluten, etc. The fibrous form of these proteins are spun into continuous aligned filaments to yield food forms which simulate the fiber of natural beef. Examples thereof are disclosed in Belgian Pat. No. 634,140, U.S. Pat. No. 3,071,477 and 3,197,310 and Cereal Chem 43 (2) 195 (1966). Animal protein such as animal collagen may also be dissolved, precipitated and aligned to yield reconstituted collagen.

One of the objects of this invention is to provide, as is clearly apparent herefrom, simultaneously, compacted, shaped, molded and unitized, self-contained, unit-integral, chew-resistant animal food system products, either unilayer or multilayer, as aforesaid and also as further hereinafter described, containing animal food and structure-supporting fibers, as aforesaid and also as further hereinafter described, with said structure-supporting fibers present in the products in amounts or amount sufficient to make my products chew-resistant, self-contained and unit-integral and to enable each of them to be and remain in compacted, shaped and molded form.

Other objects and features of my invention are readily apparent from the herein detailed description, as aforesaid and also as further hereinafter described, without any limitations thereon and only illustrative of those embodiments thereof herein described, as preferred.

In general, the percent by weight of the animal safely digestible structure-supporting fibers, such as animal hide or other forms of collagens, or the percent by weight of the animal safely indigestible structure-supporting fibers, such as the cellulosic fibers, or the percent by weight of the mixture of the two, in my unilayer food product embodiments comprises up to about 50% or more, such as from about 0.5-40%, for example from about 1-30%, such as from about 1-10%, but preferably from about 1-5%. The optimum amount will depend on various factors such as the thickness, length, etc., of the fibers, the desired chew-life, etc.

In general, the percent by weight of the animal safely digestible structure-supporting fibers, such as animal hide or other forms of collagens, or the percent by weight of the animal safely indigestible structure-supporting fibers, such as the cellulosic fibers, or the percent by weight of the mixture of the two, in my multilayer food product embodiments comprises, in that particular layer where employed, depending on the desired hardness or chew-resistance of that particular layer, up to about 50% or more, such as from about 0.5-40%, for example from about 1-30%, such as from about 1-10%, but preferably from about 1-5%. The optimum amount for the particular hardness will depend on various factors such as the thickness, length, etc., of the fibers, the desired chew-resistance, etc.

In each of my unilayer and multilayer embodiments where the mixture of the two types of structure-supporting fibers is employed, the percent by weight of each type of fibers in the mixture of fibers can be within the range of 0-100% of weight of the mixture, for example, a mixture of 100% safely digestible fibers by weight of the mixture to 100% safely indigestible fibers by weight of the mixture. For example, the mixture of fibers may be any mixture within the range of 0-100% safely digestible fibers to 100-0% safely indigestible fibers. Of course, with respect to each of my multilayer embodiments, said mixture ranges apply to each particular layer thereof.

The following Example illustrates a method of preparing fibrous collagens from hides.

EXAMPLE A

Essentially, the process employs cutters and shearing devices. The hide is cut into fiber bundles and the bundles sheared into fibers.

Hides are limed, fleshed, washed and adjusted to optimum pH. Pretreated hides are conveyed to a cutter that exerts a scissor-like action. From the cutter, the material is conveyed to a comminuating machine with openings in the cutting heads ranging from ¾ to 3/64 in. This machine controls the fiber length.

In addition to employing undigested collagen fibers, digested or partially digested collagens or mixtures thereof can also be incorporated into the molded foods.

Cowhide can be digested by treating comminuted limed cowhide in dilute acid in the presence of a proteolytic enzyme such as for example: $\alpha$-amylase, bromelin, ficin, pancreatin, papain, pepsin, steapin, trypsin, etc. so as to yield swollen collagen. The collagen can be incorporated into the food product and hardened therein. Both digested and undigested fibers can be employed. In addition, completely digested cowhide in the form of hide binder or gelatin, partially digested cowhides such as swollen collagens, and undigested hides can be incorporated into the food. Hides may also be beaten or sheared to loosen the collagen and fiber structure and these fibers separated and incorporated into the food.

The following Examples are presented by way of illustration and not of limitation.

EXAMPLE 1

Shredded cowhide (25% based on total weight of product) is blended into a pulverized mixture of cereal and freeze dried meat suitable as a dog food. Cowhide derived binder is also blended into the mixture. The resultant mixture is molded into the shape of a bone to yield a product having sufficient strength on being consumed to sufficiently exercise the dog's jaws and teeth.

EXAMPLE 2

Example 1 is repeated except that the product is molded into the following shapes (1) a stick—(2) a dumbell—(3) a ball—(4) a paddle—(5) a ring—(6) a wishbone.

EXAMPLE 3

Example 1 is repeated except that cowhide is hydrolysed at a pH of about 6.5 to a mass of slightly digested swollen collagen fibers with a proteolytic enzyme such as ficin and incorporated into pet foods to yield a bone shaped product on molding.

EXAMPLE 4

Example 3 is repeated except that both shredded cowhide (20%) and slightly digested swollen collagen fibers (5%) are incorporated into the pet food and then molded to yield the desired product.

EXAMPLE 5

Examples 1 through 4 are repeated except that an enzyme capable of removing plaque and/or tartar from the dog's teeth is incorporated into the molded product. There products are such that there are incorporated therein neutral protease, alkaline protease or amylase mixture obtained by fermenting with Bacillus subtilis NRRL-B-3411 as described in French Pat. No. 2,060,074 or any combination thereof.

EXAMPLE 6

Example 1 is repeated employing the following amounts of collagen obtained in Example A in the following amounts from 1 to 50%—i.e., 1%, 2%, 3%, 4%, 5%, 10%, 15%, 20%, 25%, 30%, 35%, 40%, 45%, 50%.

EXAMPLE 7

Example 6 is repeated except that the products also contain slightly digested swollen collagen fibers in a ratio of 1 part by weight of swollen to 4 parts by weight of undigested collagen.

EXAMPLE 8

A pulverized mixture of cereal and freeze dried meat suitable as a dog food is mixed with 5% of medical grade cellulose fibers. Cowhide derived binder is also blended into the mixture. The resultant mixture is molded into the shape of a bone to yield a product having sufficient strength on being consumed to exercise the dog's jaw and teeth.

EXAMPLE 9

Example 8 is repeated with 5% of fibrous soya derived vegetable protein to yield a molded bone capable of exercising the dog's teeth and jaws.

EXAMPLE 10

This example illustrates the use of baking as a means of preparing the compacted product of this invention.

Collagen fibers were incorporated into cracker-type dough and baked to yield chew-resistant crackers. A range of concentrations of fibers were incorporated into the dough, i.e., 1%, 2%, 3%, 4%, 5%, 6%, 7%, 8%, 9%, 10%, etc., to yield a product which is more chew-resistant than crackers prepared without the fibers.

Baking was effected by both a batch-type as well as the continuous bake extrusion process.

EXAMPLE 11

Shredded cowhide (5% based on total weight of product) is blended into a pulverized mixture of cereal and freeze dried meat suitable as a dog food. Cowhide-derived binder is also blended into the mixture. The resultant mixture is molded into the shape of a rod to yield a product having sufficient strength to exercise the dog's jaws and teeth.

This hard rod is placed in a bone shape mold and surrounded with the same pulverized mixture of cereal and freeze dried meat which contains neither shredded cowhide nor cowhide-derived binder to yield a soft and more easily pulverizable outer layer. Thus the product has an inner hard core and an outer soft layer, i.e., a hard/soft configuration as illustrated in FIG. 1.

EXAMPLE 12

Figure 2:
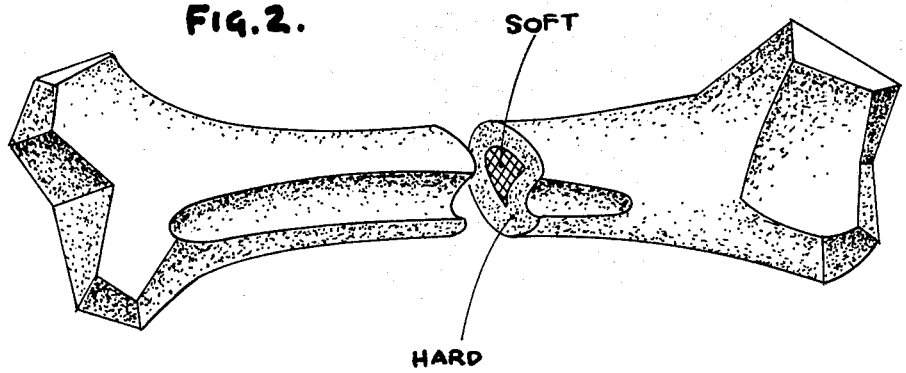
FIG. 2 illustrates another embodiment in the shape of a bone having a hard exterior layer and a soft core layer.

Example 11 is repeated except that the inner core is soft (i.e., without shredded hide or cowhide-derived binder) and the outer layer is hard (i.e., with shredded hide and cowhide derived binder) to yield a soft inner core and a hard outer layer (i.e., a soft/hard configuration as illustrated in FIG. 2).

EXAMPLE 13

Example 11 is repeated except that the outer layer contains only cowhide-derived binder to yield a hard inner core and a soft, but less crumbly, outer layer (i.e., a hard/soft-hard configuration).

EXAMPLE 14

Example 12 is repeated except that the inner core contains cowhide-derived binder to yield a soft, but less crumbly, inner core and an outer hard layer (i.e., a soft-hard/hard configuration).

EXAMPLE 15

Example 11 is repeated except that the outer layer contains 2% shredded cowhide and a cowhide-derived binder to yield a hard inner core and a less hard outer layer (i.e., a hard/soft-hard configuration).

EXAMPLE 16

Example 12 is repeated except that the inner core has 2% shredded cowhide and cowhide derived binder to yield a moderately hard inner core and a hard outer layer (i.e., a soft-hard/hard configuration).

EXAMPLE 17

Figure 3:
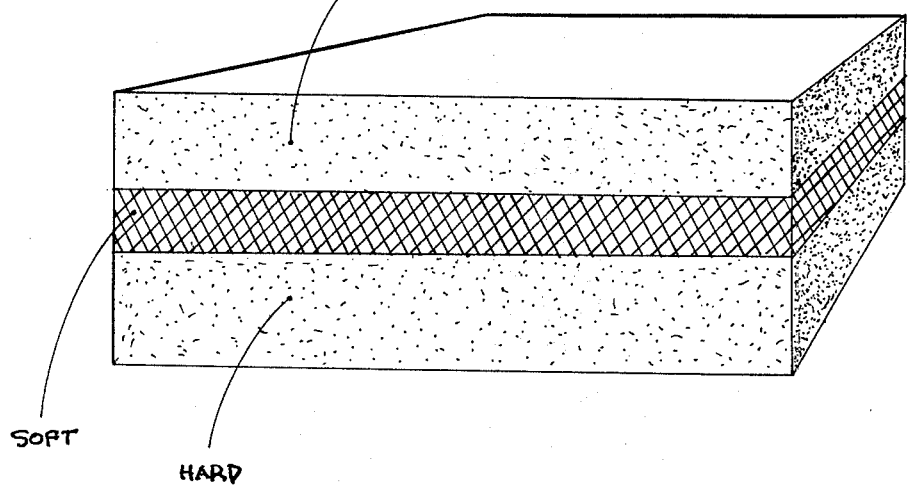
FIG. 3 illustrates stock material with alternating layers.

Shredded cowhide (7½% based on total weight of product) is blended into a pulverized mixture of cereal and freeze dried meat suitable as a dog food and cowhide derived binder is blended into the mixture and the resultant mixture molded into two rectangular blocks. The pulverized dog food containing only cowhide derived binder is placed between these two blocks and pressure exerted thereon to sandwich an inner softer layer between the two outer hard blocks to yield a unitary product (i.e., a hard/soft/hard configuration as illustrated in FIG. 3).

The principles of this invention are evident from the foregoing examples. Likewise with the unilayer embodiments of my invention herein, as illustrated by the foregoing examples 1 through 10, employing the principle of varying layers of hardness in the multilayer embodiments of my invention herein, as illustrated by the foregoing examples 11 through 17, employing various shapes such as a stick, dumbell, ball, paddle, ring, wishbone, etc., and employing as many layers as desired the combinations herein are infinite such as 1, 2, 3, 4, 5, 6, 7, 8, 9, 10, or more layers.

In addition, both with respect to the unilayer embodiments of my invention and to the multilayer embodiments of my invention, the collagen employed in both the unilayer and the multilayer products of this invention can be digested collagen, vegetable protein, such as fibrous soya-derived vegetable protein, etc. Also, non-collagens such as animal safely indigestible structure-supporting fibers, such as cellulose, etc., can be used in said products in place of the collagen. Also, as aforesaid, mixtures of the collagen, or collagens, and said animal safely indigestible structure-supporting animal fibers, the non-collagens, such as cellulose, etc., can be employed in both my unilayer and multilayer embodiments, as aforesaid. My products also can contain chemicals and enzymes for removing plaque and/or tartar such as Bacillus Subtilis NRRL-B-3411 as described in French Patent 2,060,074, vitamins and other food supplements, etc.

With respect to both my unilayer and multilayer embodiments of this invention, certain non-limiting advantages of the unitary construction of the instant invention are as follows:

(1) Less space is required in that the compaction of the components occupies a smaller volume of space as compared to existing foods; this smaller space requirement is very important in all phases of manufacturing, packaging, distribution and storage.

(2) The configuration of the unit can be designed to provide various exposed facets and angles which may be brought into play to exercise various parts of the animal's mouth, teeth and gums as well as muscles in that to chew upon the unit, depending upon the angle of positioning, various surfaces of the unit and the animal come into contact providing an infinite number of combinations of contact.

(3) The extended chew-life imparted by the integrity of the unit permits the acting time of any additive or medicinal aid to be prolonged, thus permitting more efficiency.

(4) The unitary construction permits an entire meal to be used as a conditioning tool under a variety of circumstances such as in retrieving, heeling, command control such as the discipline of not eating until given permission.

(5) Product identity can be embodied in the present invention in that different manufacturers may use different configurations to differentiate their product from competitors.

(6) Component identity can be embodied in the shape or configuration imparted to denote contents and/or flavor. For example, a fish for that flavor; a triangle or other distinctive shape for a particular flavor, etc.

(7) The ecological and conservation aspects of this system are important in that the unitary construction permits the unit itself to be self-containerized eliminating in some instances the use and disposal of a metallic container. The amount of wrapping that may be used is diminished in that a smaller volume of space is used per unit of weight because of the compact nature of the invention.

While representative embodiments have been shown for the purposes of illustrating the invention, it will be apparent to those skilled in the art that various changes and modifications may be made without departing from the spirit of the invention.

I claim:

1. A simultaneously compacted, shaped, molded, and unitized, self-contained, unit-integral, chew-resistant animal food system product containing at least one chew-resistant layer with animal food as a part thereof and at least one lesser chew-resistant layer with animal food as a part thereof, said latter layer being less chew-resistant than said former layer, the chew-resistance of each of said layers being primarily controlled by the relative presence or absence of structure-supporting fibers, said structure-supporting fibers being a mixture of animal safely digestible structure-supporting fibers and animal safely indigestible structure-supporting fibers, said structure-supporting fibers being present in said animal food system product in said latter layer and in said former second layer or in said latter layer or in said former layer in amounts or in an amount sufficient to make said animal food system product chew-resistant, self-contained and unit-integral and to enable it to be and remain in its compacted shaped and molded form.

2. The simultaneously compacted, shaped, molded, and unitized, self-contained, unit-integral, chew-resistant animal food system product of claim 1 wherein the animal safely digestible structure-supporting fibers are collagen.

3. The simultaneously compacted, shaped, molded, and unitized, self-contained, unit-integral, chew-resistant animal food system product of claim 2 wherein the collagen is derived from animal hide.

4. The simultaneously compacted, shaped, molded, and unitized, self-contained, unit-integral, chew-resistant animal food system product of claim 1 which also contains supplemental additives.

5. The simultaneously compacted, shaped, molded, and unitized, self-contained, unit-integral, chew-resistant animal food system product of claim 2 which also contains supplemental additives.

6. The simultaneously compacted, shaped, molded, and unitized, self-contained, unit-integral, chew-resistant animal food system product of claim 1 wherein the animal safely indigestible structure-supporting fibers are cellulosic.

7. The simultaneously compacted, shaped, molded, and unitized, self-contained, unit-integral, chew-resistant animal food system product of claim 6 which also contains supplemental additives.

8. The simultaneously compacted, shaped, molded, and unitized, self-contained, unit-integral, chew-resistant animal food system product of claim 1 wherein the animal safely digestible structure-supporting fibers are collagen and the animal safely indigestible structure-supporting fibers are cellulosic.

9. The simultaneously compacted, shaped, molded, and unitized, self-contained, unit-integral, chew-resistant animal food system product of claim 8 which also contains supplemental additives.

* * * * *